US012091294B2

(12) United States Patent
Hall et al.

(10) Patent No.: US 12,091,294 B2
(45) **Date of Patent: *Sep. 17, 2024**

(54) LINE TENSIONER

(71) Applicant: Hall Labs LLC, Provo, UT (US)

(72) Inventors: Michael Hall, Provo, UT (US); David R. Hall, Provo, UT (US); Michael Shinedling, Provo, UT (US); Nathan Davis, Bountiful, UT (US)

(73) Assignee: Hall Labs LLC, Provo, UT (US)

( * ) Notice: Subject to any disclaimer, the term of this patent is extended or adjusted under 35 U.S.C. 154(b) by 70 days.

This patent is subject to a terminal disclaimer.

(21) Appl. No.: 17/719,268

(22) Filed: Apr. 12, 2022

(65) Prior Publication Data

US 2022/0324683 A1 Oct. 13, 2022

Related U.S. Application Data

(60) Provisional application No. 63/273,337, filed on Oct. 29, 2021, provisional application No. 63/173,974, filed on Apr. 12, 2021.

(51) Int. Cl.
*B66D 1/50* (2006.01)
*B66D 1/74* (2006.01)

(52) U.S. Cl.
CPC ............... *B66D 1/505* (2013.01); *B66D 1/74* (2013.01); *B66D 2700/0141* (2013.01)

(58) Field of Classification Search
CPC ... B66D 1/12; B66D 1/34; B66D 1/36; B66D 1/42; B66D 1/7405; B66D 1/7426; B66D 2700/0141; B66D 2700/0191
See application file for complete search history.

(56) References Cited

U.S. PATENT DOCUMENTS

| | | | | | |
|---|---|---|---|---|---|
| 3,843,094 | A * | 10/1974 | Watts | B66D 1/36 | 74/506 |
| 3,887,164 | A * | 6/1975 | Coombs | B66D 1/7405 | 254/296 |
| 2008/0061277 | A1* | 3/2008 | Grapes | B66D 1/36 | 254/352 |
| 2008/0302289 | A1* | 12/2008 | Mann | B66D 1/7484 | 254/266 |
| 2017/0253469 | A1* | 9/2017 | Hall | B66D 1/30 | |
| 2017/0320712 | A1* | 11/2017 | Shook | B66D 1/12 | |
| 2018/0050892 | A1* | 2/2018 | Hall | B66D 1/38 | |
| 2021/0285525 | A1* | 9/2021 | Hall | B66D 1/36 | |
| 2022/0324684 | A1* | 10/2022 | Hall | B66D 1/7415 | |
| 2023/0135307 | A1* | 5/2023 | Hall | B66D 1/7405 | 254/343 |

FOREIGN PATENT DOCUMENTS

| | | | | |
|---|---|---|---|---|
| CN | 2155666 Y | * | 2/1996 | A01K 39/01 |
| EP | 3181509 A1 | * | 6/2017 | B66D 1/7415 |
| EP | 3835251 A1 | * | 6/2021 | B66D 1/7436 |

* cited by examiner

*Primary Examiner* — Emmanuel M Marcelo

(57) ABSTRACT

A line tensioner is disclosed. A winch has a winch drum with at least one groove over which a line is passed. The winch has a line tensioner assembly with a stationary cam surface and a plurality of line tensioners rotating with the winch drum. Each has a line gripping portion and a cam follower. The line gripping portion is brought into and out of contact with the line as the cam follower rides along at least a portion of the cam surface.

20 Claims, 10 Drawing Sheets

LINE TENSIONER

CROSS-REFERENCE TO RELATED APPLICATIONS

This application claims priority to U.S. Provisional Patent Application No. 63/173,974 filed Apr. 12, 2021 and titled "Line Tensioner" and to U.S. Provisional Patent Application No. 63/273,337, filed Oct. 29, 2021 and titled "Capstan Winch."

TECHNICAL FIELD

This disclosure relates generally to winches.

BACKGROUND

Winches and hoists have proven useful tools in moving objects of considerable size and weight. Some winches function by winding or unwinding the line that is coiled around a horizontal rotating drum and thereby pulling a load. A hoist is a device used for lifting or lowering a load by means of a drum or lift-wheel around which the line wraps. In both instances, spooling of the line around the drum or similar causes wear on the line and other issues. Improved winching, hoisting, and climbing devices are needed.

SUMMARY

In a first aspect, the disclosure provides a winch. The winch has a winch drum with at least one groove over which a line is passed. The winch also has a line tensioner assembly with a stationary cam surface and a plurality of line tensioners rotating with the winch drum. Each tensioner has a line gripping portion and a cam follower. The line gripping portion is brought into and out of contact with the line as the cam follower rides along at least a portion of the cam surface.

In a second aspect, the disclosure provides a device for moving an object. A drive cylinder has at least three drive grooves rotating in parallel planes that are perpendicular to a long axis of the drive cylinder. A shaft is parallel to the drive cylinder and has at least two idler pulleys rotating. The idler pulleys rotate in planes parallel to each other. The planes are at an angle to the parallel planes of the drive grooves, such that, as a line passes around a first drive groove, onto a first idler pulley, and around the first idler pulley, the line, as it comes off the first idler pulley, is aligned with a second drive groove. As the line comes around the second drive groove, onto a second idler pulley, and around the second idler pulley, the line, as it comes off the second idler pulley, is aligned with a third drive groove. The line is attached at a first end to an object and a second end is under tension. As the drive cylinder is rotated the object is moved. A line tensioner assembly provides the tension to the second end and has a stationary cam surface and a plurality of line tensioners rotating with the drive cylinder. Each has a line gripping portion and a cam follower. The line gripping portion is brought into and out of contact with the line as the cam follower rides along at least a portion of the cam surface, the line gripping portion pressing the line, providing tension, when the line gripping portion is in contact with the line.

Further aspects and embodiments are provided in the foregoing drawings, detailed description, and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
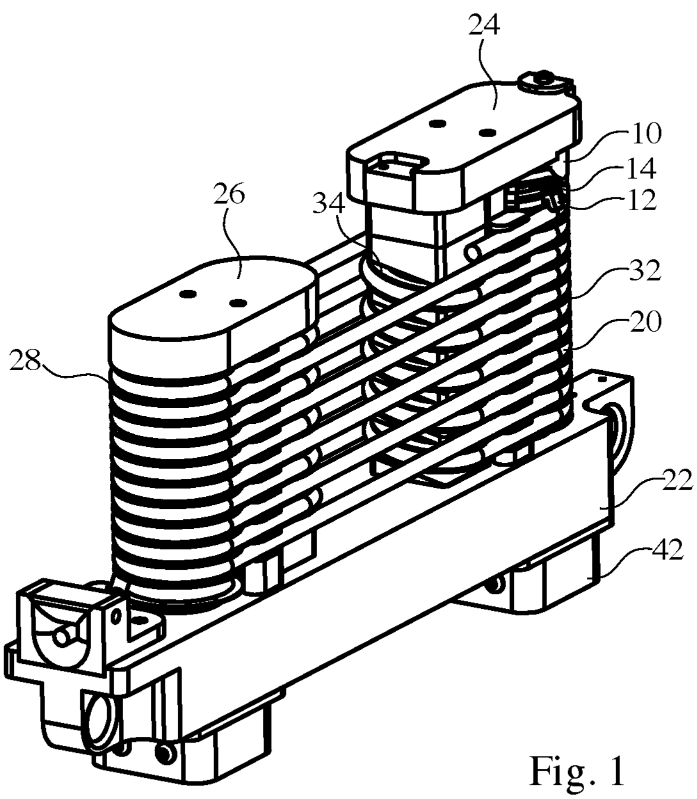
FIG. 1 is a front-left-top isometric view of a winch with line tensioners.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "line" is meant to refer to any device or material that is long, thin, flexible, and having a high tensile strength. Preferably, this will be a braided rope, but braided wires, cords, string, twine, cable, strand, chains and combinations thereof may be used as well.

As used herein, "capstan effect" is meant to refer to the small holding force exerted on a line by one side of a cylinder and the line therefore being able to carry a much larger loading force on the other side, as shown in the Capstan equation. Rotation of the cylinder multiplies the applied tension by the friction between the line and the cylinder.

Capstan effect devices are used to lift and pull objects, but typical capstan effect devices have some limitations. The line wrapping around the drum overlaps or rubs against itself. The line naturally would exit and enter typical capstan effect devices at whatever location the line comes off the drum. Further, the line requires tensioning on the non-load end of the line, typically by a weight or pulley that pinches and pulls on the line. The present invention overcomes that limitation. Rather than having an external means for tensioning, the line tensioners are built directly onto the winch drum that carries the line. The line tensioners are pushed down by a cam to directly pinch the line against the winch drum. As the winch drum rotates, the line tensioners rotate to where the cam retracts and a spring or other pulling force retracts the line tensioners, releasing the tension on the line so the line can proceed off the winch drum. In this way, where the line is in contact with the drum, the line is pinched against the drum, providing the tension needed for the capstan effect.

FIG. 1 is a front-left-top isometric view of a winch with line tensioners that may be used in one embodiment of the present invention. The winch assembly 22 consists of two sets of capstan-effect pulley assemblies, 24 and 26. Assemblies 24 and 26 consist of drive cylinders with drive grooves. The drive grooves rotate perpendicular to the long axis of the drive cylinder. Both drive assemblies further include idler pulleys. The idler pulleys rotate parallel to one another, with the planes of rotation being angled in relation to the planes of the drive grooves. In some embodiments, the angle of the plane is between about three degrees and about thirty degrees. In some embodiments, the angle of the plane is between about five degrees and about twenty degrees. Assembly 24 consists of a drive cylinder 32 with drive grooves rotating in parallel planes that are perpendicular to a long axis of the drive cylinder. A shaft parallel to the drive cylinder has idler pulleys 34. The idler pulleys 34 rotate in planes parallel to each other, which planes are at an angle to the parallel planes of the drive grooves, such that, as a line 20 passes around a first drive groove, onto a first idler pulley 34, and around the first idler pulley 34, the line 20, as it comes off the first idler pulley 34, is aligned with a second drive groove. Assembly 26 consists of a winch drum 28 with grooves rotating in parallel planes that are perpendicular to a long axis of the winch drum. In this embodiment, every other groove, the line passes between assembly 24 and assembly 26. The line tensioners consist of a line gripping portion 12, a cam follower 14. The line 20 exits assembly 26 and is directed to a load. The line exits assembly 24 and can simply spool up, as the line tensioners provide the required tension for the capstan effect. The tensioners ride along a stationary cam surface 10. The line gripping portion 12 is brought into and out of contact with the line 20

Figure 2:
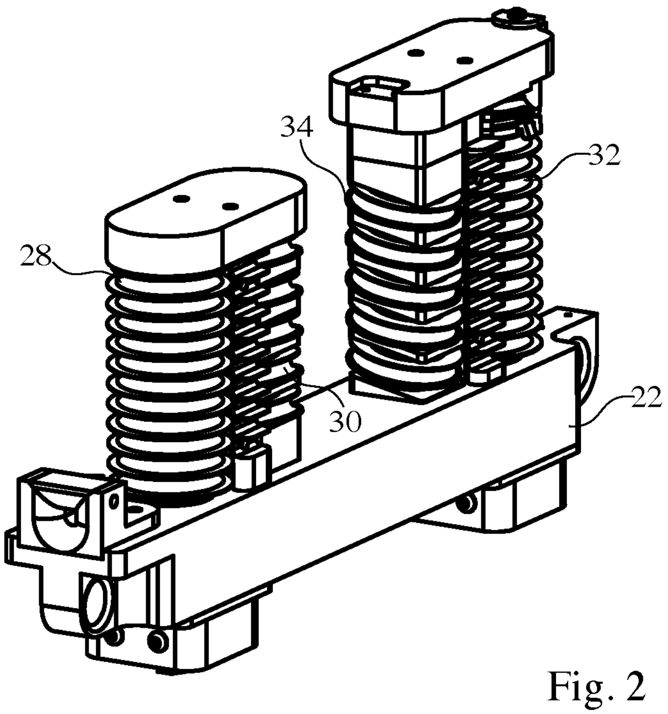
FIG. 2 is a front-left-top isometric view of the winch of FIG. 1, without the line.

FIG. 2 is a front-left-top isometric view of the winch of FIG. 1, without the line. A shaft parallel to the winch drum has idler pulleys 30. The idler pulleys 30 rotate in planes parallel to each other, which planes are at an angle to the parallel planes of the grooves, such that, as the line 20 passes around the first groove, onto a first idler pulley 30, and around the first idler pulley 30, the line 20, as it comes off the first idler pulley 30, is aligned with a second groove.

Figure 3:
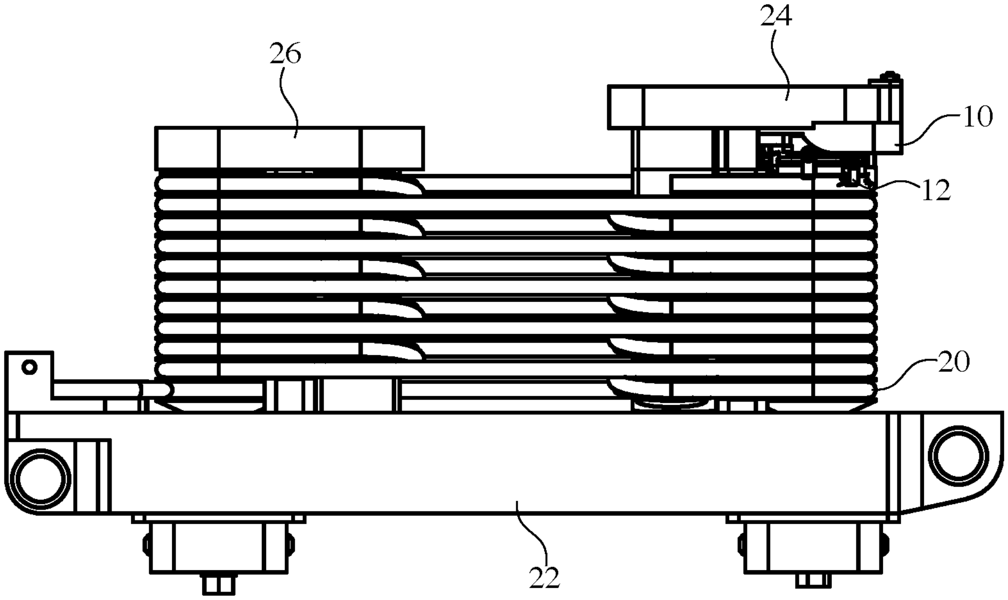
FIG. 3 is a front elevation view of the winch of FIG. 1.

FIG. 3 is a front elevation view of the winch of FIG. 1. The capstan winch includes drive assemblies 24 and 26. Each of the assemblies includes a drive cylinder with drive grooves, and idler pulleys. The idler pulleys are set at an angle relative to the drive grooves. In this way as the line passes from drive groove to idler pulley to the next drive groove, the angle of the idler pulley transfers the line from one drive groove to the next. There are also fewer idler pulleys than drive grooves, this is so that both assemblies can work together to lift and pull objects. The path of the line proceeds from top to bottom as follows: the line enters the first drive groove of assembly 24, which includes line tensioners to grip the line. The line passes around this first drive groove to the first line groove of the assembly 26, the line passes to the first idler pulley of drive groove 26, around the idler pulley to the next drive groove, around the second drive groove to the second drive groove of the assembly 24 around the drive groove to the first idler pulley of drive assembly 24 to the third drive groove of assembly 24, around the third drive groove to the third drive groove of assembly 24. The line progresses through each drive and drive groove until the line has passed around each drive groove on both assemblies.

Figure 4:
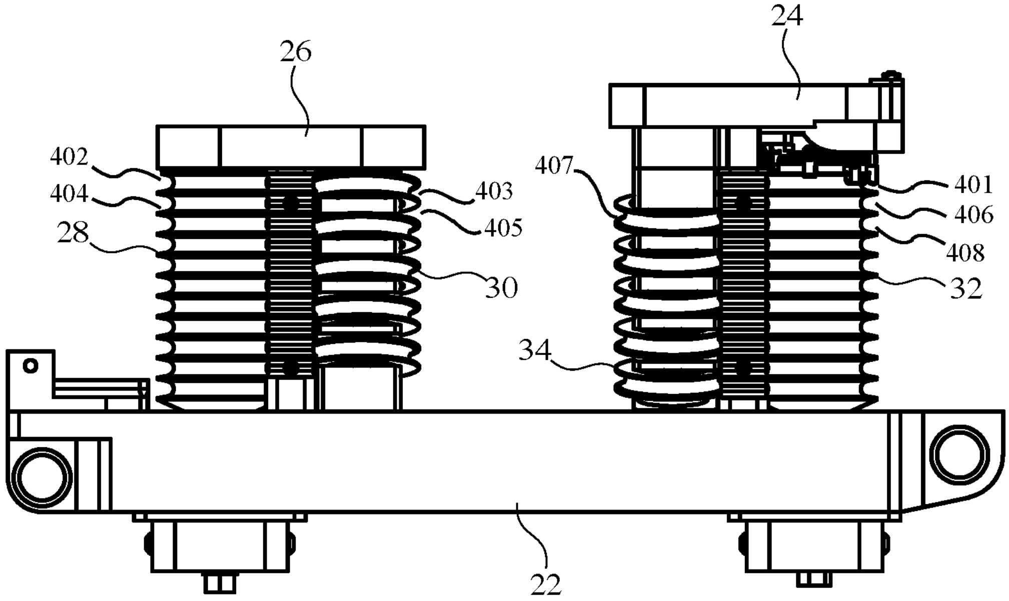
FIG. 4 is a front elevation view of the winch of FIG. 1, without the line.

FIG. 4 is a front elevation view of the winch of FIG. 1, without the line. Without the line on the capstan winch, the drive grooves and idler pulleys can be seen. The line needs to pass between the two assemblies so that the pulleys can reduce the force necessary to move the line. To accomplish this, there are gaps between the idler pulleys. These gaps correspond to the line passing between the drive grooves on assembly 24 to the drive grooves on assembly 26. The path of the line would proceed from top to bottom as follows: the line would enter the first drive groove 401 of assembly 24, which includes line tensioners to grip the line. The line would pass around this first drive groove to the first line groove 402 of the assembly 26, the line would pass to the first idler pulley 403 of drive groove 26, around the idler pulley 403 to the next drive groove 404, around the second drive groove 404 of the assembly 26, through the gap 405 between the idler pulleys, to the second drive groove 406 of the assembly 24 around the drive groove 406 to the first idler pulley 407 of drive assembly 24 to the third drive groove 408 of assembly 24, around the third drive groove 408 and continues to the third drive groove of assembly 24 and to the rest of the idler pulleys and drive grooves. The line would progresses through each drive and drive groove until the line would have passed around each drive groove on both assemblies.

Figure 5:
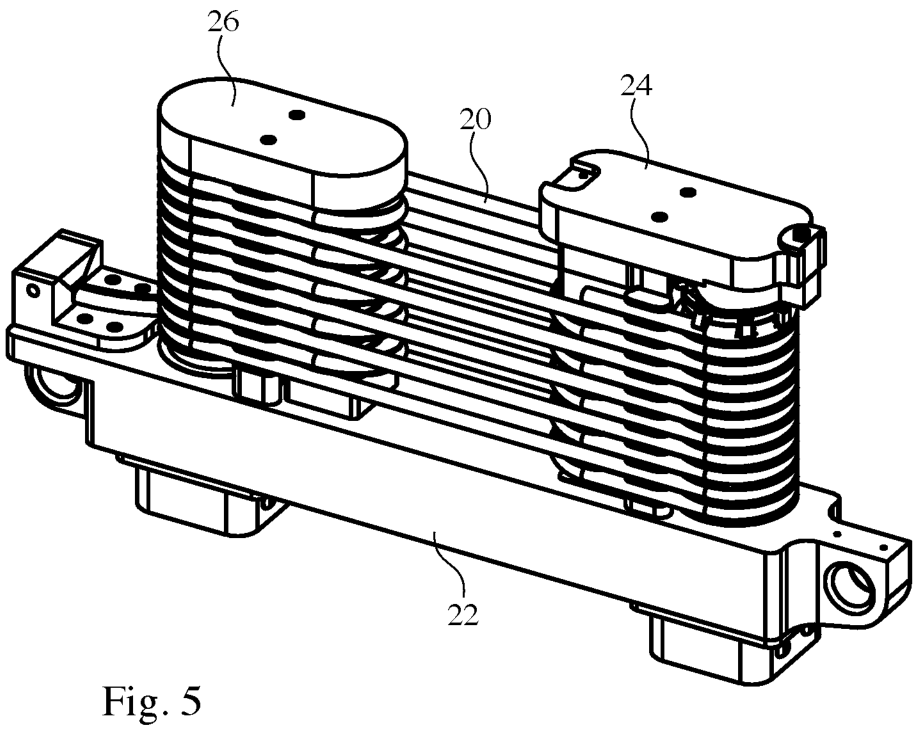
FIG. 5 is a front-right-top isometric view of the winch of FIG. 1.

FIG. 5 is a front-right-top isometric view of the winch of FIG. 1. The capstan winch includes drive assemblies 24 and 26. Each of the assemblies includes a drive cylinder with drive grooves, and idler pulleys. The idler pulleys are set at an angle relative to the drive grooves. In this way as the line passes from drive groove to idler pulley to the next drive groove, the angle of the idler pulley transfers the line from one drive groove to the next. There are also fewer idler pulleys than drive grooves, this is so that both assemblies can work together to lift or pull objects. The path of the line proceeds from top to bottom as follows: the line enters the first drive groove of assembly 24, which includes line tensioners to grip the line. the line passes around this first drive groove to the first line groove of the assembly 26, the line passes to the first idler pulley of drive groove 26, around the idler pulley to the next drive groove, around the second drive groove to the second drive groove of the assembly 24 around the drive groove to the first idler pulley of drive assembly 24 to the third drive groove of assembly 24, around the third drive groove to the third drive groove of assembly 24. The line progresses through each drive and drive groove until the line has passed around each drive groove on both assemblies.

Figure 6:
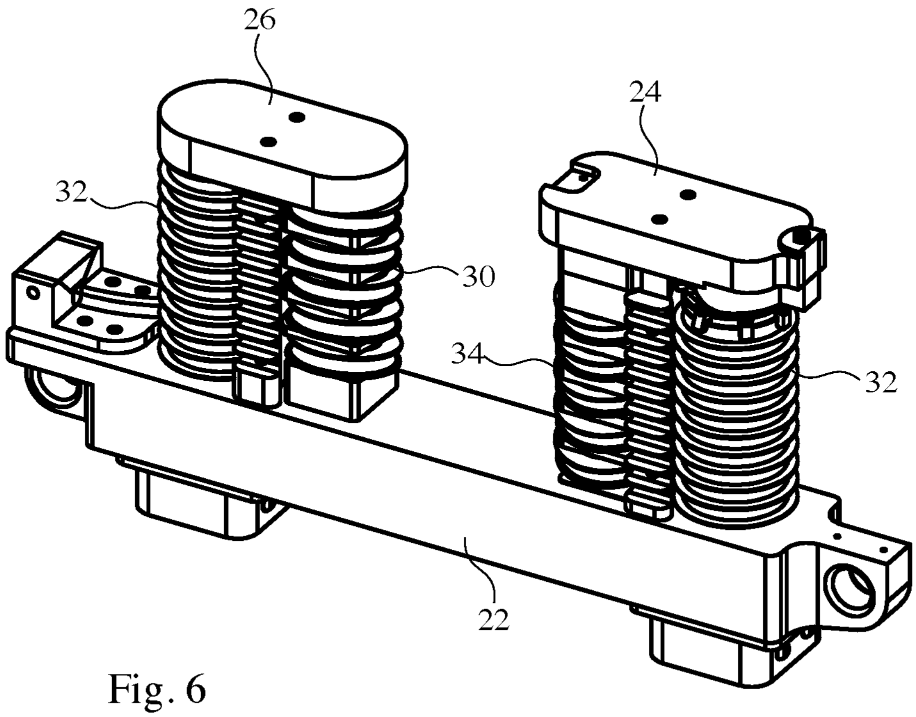
FIG. 6 is a front-right-top isometric view of the winch of FIG. 1, without the line.

FIG. 6 is a front-right-top isometric view of the winch of FIG. 1, without the line. Without the line on the capstan winch the drive grooves and idler pulleys can be seen. The line needs to pass between the two assemblies so that the pulleys can reduce the force necessary to move the line. To accomplish this, there are gaps between the idler pulleys. These gaps correspond to the line passing between the drive grooves on assembly 24 to the drive grooves on assembly 26.

Figure 7:
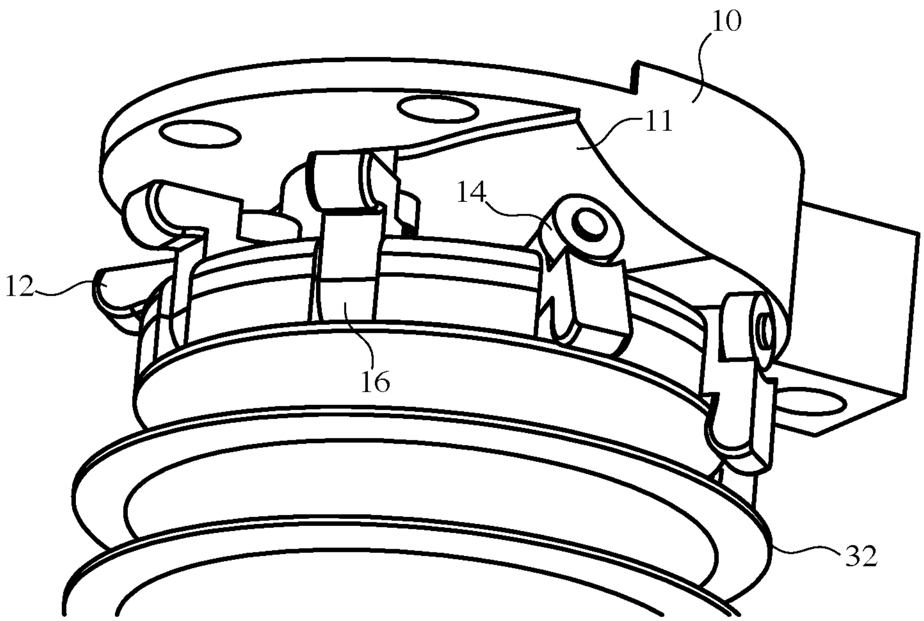
FIG. 7 is a front-left-bottom isometric closeup view of the line tensioners, cam, and drive cylinder of FIG. 1, without the line.

FIG. 7 is a front-left-bottom isometric closeup view of the line tensioners, cam, and drive cylinder of FIG. 1, without the line. The line tensioners consist of a line gripping portion 12, a cam follower 14, a lever arm 16, and a tension spring. The tensioners ride along a stationary cam surface 10. The tensioners are attached to a plate (as further described in FIG. 12). The line gripping portion 12 moves from a gripping position to a release position as the cam follower 14 rides along at least a portion of the cam surface 10, the line gripping portion 12 moving down into the gripping. The cam surface is shaped so the cam followers 14 will be moved from a release position to a grip position as the drive cylinder 32 is rotated. In some embodiments, the line tensioners are L-shaped with a grip portion 12 forming one leg of the L and a lever arm forming the other leg of the L. The line tensioners rotate so that each leg of the L will stop in positions that are 90 degrees from one another. Thus in some embodiments the lever arm will be in a vertical or 90-degree orientation in the release position and as the tensioner moves into the grip position the lever arm will be in a horizontal or 0-degree orientation. While the lever arm starts in a 90-degree orientation, or an essentially vertical orientation, the grip portion begins in a 0-degree orientation, or an essentially horizontal position, and moves down to a vertical 90-degree orientation, or essentially vertical position. The cam followers 14 attach to the line tensioners where the outer surface of the lever arm and the grip portion meet to form the right angle of the L. In some embodiments, the cam follower is a wheel. As the drive cylinder 32 is rotated, the cam followers ride along the cam surface. The cam includes a ramp or angled portion 11. The cam surface 10 is adjacent to the drive cylinder 32 along a C-shaped portion of the cam. This C-shaped portion of the cam is the area where the cam follower is in contact with the cam. When the cam follower is contacts the cam, the line gripping portion moves from its horizontal position to the vertical position. This occurs as the wheel 14 contacts the ramp 11 of the cam and stays in contact with the C-shaped portion 13 of the cam. The line grippers are designed so that the grip portion moves from a horizontal release position to a vertical grip position. When there is no line in the device the grip portion will move a full 90 degrees. Ropes and lines of differing thickness and differing compressibility will affect the ability of the line tensioners to move through the full 90 degrees. Less movement of the line tensioners will occur with a line that is thicker and with a line that is less compressible. More movement of the line tensioners will occur with a line that is thinner or more compressible. A line that is too thin will not be gripped at all and will not function with the line tensioners. A line that is too thick will not allow the tensioners to rotate enough to move past the incline portion of the cam and will damage the device. As each line tensioner completes its rotation around the C-shaped portion of the cam, another incline facilitates the release of the tensioner. The cam followers will remain in contact with the surface of the cam and as the cam follower, follows the incline the line tensioner rotates such that the grip portion returns to the horizontal position. wherein the C-shaped portion pushes the cam follower 14 such that the line gripping portion 12 contacts the line and the remaining portion 11 brings the cam follower back such that the line gripping portion 12 is out of contact with the line 20. In this manner, the device is a capstan-effect winch with built-in tensioner.

In this embodiment, the cam follower 14 is a wheel. The line gripping portion 12 is brought out of contact with the line by a spring 17 that pulls the line gripping portion 12 away from the line 20.

Figure 8:
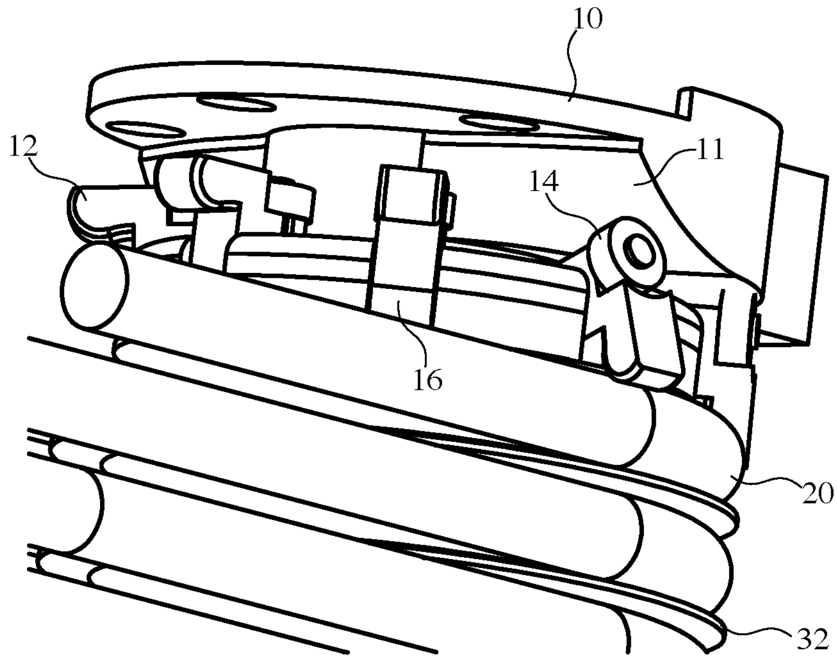
FIG. 8 is a front-left-bottom isometric closeup view of the line tensioners, cam, and drive cylinder of FIG. 1, with the line.

FIG. 8 is a front-left-bottom isometric closeup view of the line tensioners, cam, and drive cylinder of FIG. 1, with the line. The tensioners ride along a stationary cam surface 10. The tensioners are attached to a plate (as further described in FIG. 12). The line gripping portion 12 moves from a release position to a gripping position as the cam follower 14 rides along at least an inclined portion 11 of the cam 10. The line gripping portion 12 moving from a primarily horizontal position down into the primarily vertical gripping position. The cam surface is shaped so the cam followers 14 will be moved from a release position to a grip position as the drive cylinder 32 is rotated. As the drive cylinder 32 is rotated, the cam followers ride along the cam 10 surface. The cam 10 includes a ramp or inclined portion 11. The cam 10 is adjacent to the drive cylinder 32 along a C-shaped portion of the cam. This C-shaped portion of the cam is the area where the cam follower 14 is in contact with the cam. When the cam follower is contacts the cam, the line gripping portion moves from its primarily horizontal position to the primarily vertical position. This occurs as the wheel 14 contacts the ramp 11 of the cam and stays in contact with the C-shaped portion 13 of the cam. The line grippers are designed so that the grip portion moves from a primarily horizontal release position to a primarily vertical grip position. When the line tensioner is rotated from the release position to the gripping position the grip portion of the line tensioner is in contact with the line. Each line tensioner remains in contact with the line 20 as it rotates around the C-shaped portion of the cam. As each line tensioner completes its rotation around the C-shaped portion of the cam, another incline facilitates the release of the tensioner. The cam followers will remain in contact with the surface of the cam and as the cam follower, follows the incline the line tensioner rotates such that the grip portion returns to the primarily horizontal release position. As the tensioners move to the release position the grip portion 12 of the tensioners no longer contact the line 20 and the line 20 is released.

Figure 9:
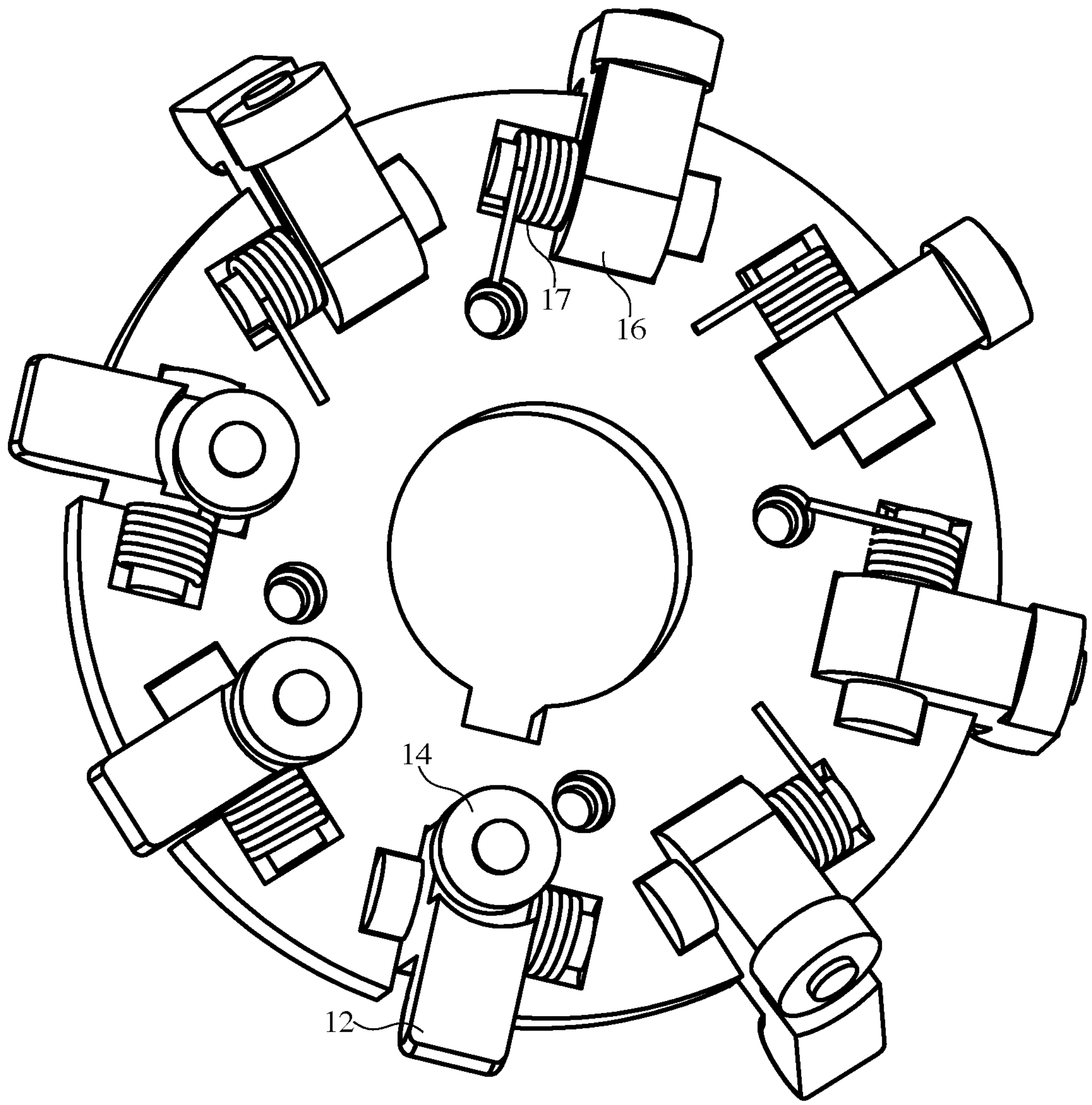
FIG. 9 is a top view of the line tensioners of FIG. 1.

FIG. 9 is a top view of the line tensioners of FIG. 1. The line tensioners are attached to a plate. Each tensioner pivots on an axle. The axle passes through a bore in the end of the lever arm which can be thought of as one leg of the L of the line tensioner. The tensioners further include a spring such as spring 17 to return the tensioner to the release position. The plate to which the tensioners attach is includes and aperture for the drive shaft of the drive cylinder. The plate is rotated around the drive cylinder so that the line tensioners are also rotated to achieve their position for gripping the line.

Figure 10:
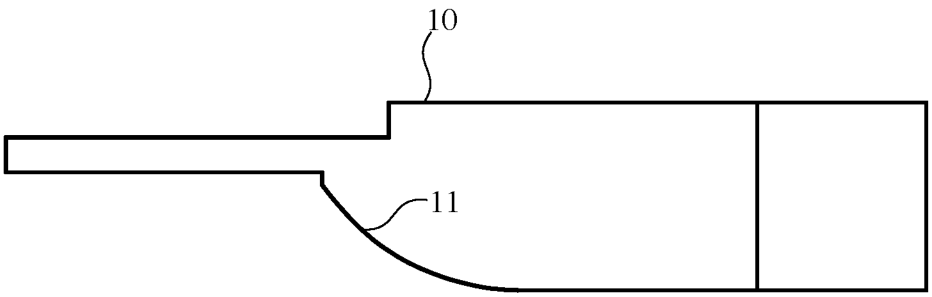
FIG. 10 is a front elevation view of the cam of FIG. 1.

FIG. 10 is a front elevation view of the cam of FIG. 1. The cam 10 is shaped with a ramp 11 so that the line tensioners will be moved from a release position to a gripping position. The cam followers follow the surface of the cam to move the line tensioners from a release position to a gripping position and back to a to a release position.

Figure 11:
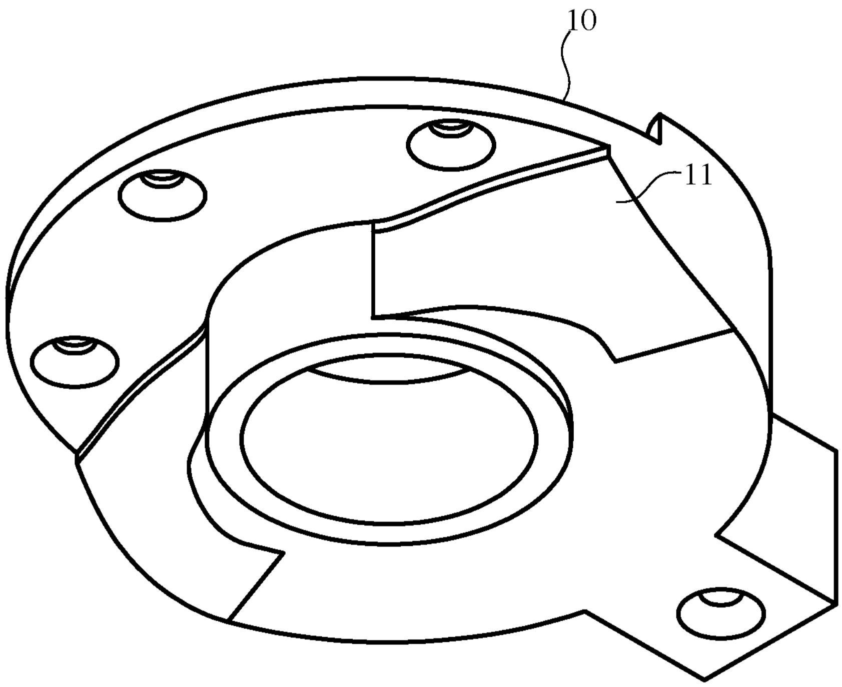
FIG. 11 is a front-left-bottom isometric view of the cam of FIG. 1.

FIG. 11 is a front-left-bottom isometric view of the cam of FIG. 1. The cam 10 is shaped with a ramp 11 so that the line tensioners will be moved from a release position to a gripping position. The cam followers follow the surface of the cam to move the line tensioners from a release position to a gripping position and back to a to a release position.

Figure 12:
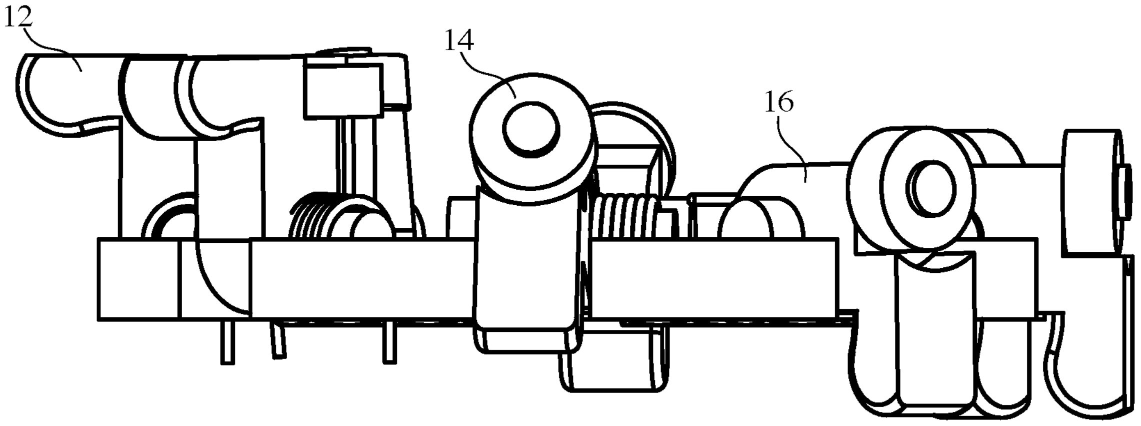
FIG. 12 is a front elevation view of the line tensioners of FIG. 1.

FIG. 12 is a front elevation view of the line tensioners of FIG. 1. The line tensioners are attached to a plate. Each tensioner pivots on an axle. The axle passes through a bore in the end of the lever arm which can be thought of as one leg of the L of the line tensioner. The tensioners further include a spring such as spring 17 to return the tensioner to the release position. The plate to which the tensioners attach includes an aperture for the drive shaft of the drive cylinder. The plate is rotated around the drive cylinder so that the line tensioners are also rotated to achieve their position for gripping the line. The axles attach on the top of the plate. Each line tensioner has a corresponding cutout in the plate. When in the horizontal, or gripping position, the base of the plate aligned with the lower face of the lever arm of the tensioner. A line will lay flush against the lower surface of the plate and the lower face any tensioners in the grip position. The grip portions fall below the lower surface of the plate.

Each tensioner has a lever arm 16 and a gripping portion 12. The tensioners form an L with the lever arm being one leg of the L and the gripping portion being the other leg of the L. In some embodiments, the L of the tensioner is made of a metal. In some embodiments, the metal is aluminum or an aluminum alloy. In other embodiments, the metal is steel. In some of these embodiments, the steel is stainless steel. In some embodiments, the L is titanium. In some embodiments, the L is made of a synthetic material. In some embodiments, the synthetic material is a plastic. In some embodiments, the synthetic material is carbon fiber. In some embodiments, the grip portion is coated or covered. When the grip portion is coated or covered it is generally coated in a material to improve grip, such as rubber. Other materials to improve grip include silico, foam, or malleable plastics. In some other embodiments, it will be desirable to increase the durability of the line tensioners, in these embodiments the grip portion is coated or covered in a material that resists abrasion and wear, such materials include metals, ceramics, and . . . . In some embodiments, grip and durability are achieved by coating the grip portion in a rubber infused with silica.

The cam follower 14, in the depicted embodiment, is a wheel attached to the L of the tensioner. These wheels are made of a plastic, or a metal, or a combination of several materials.

Figure 13:
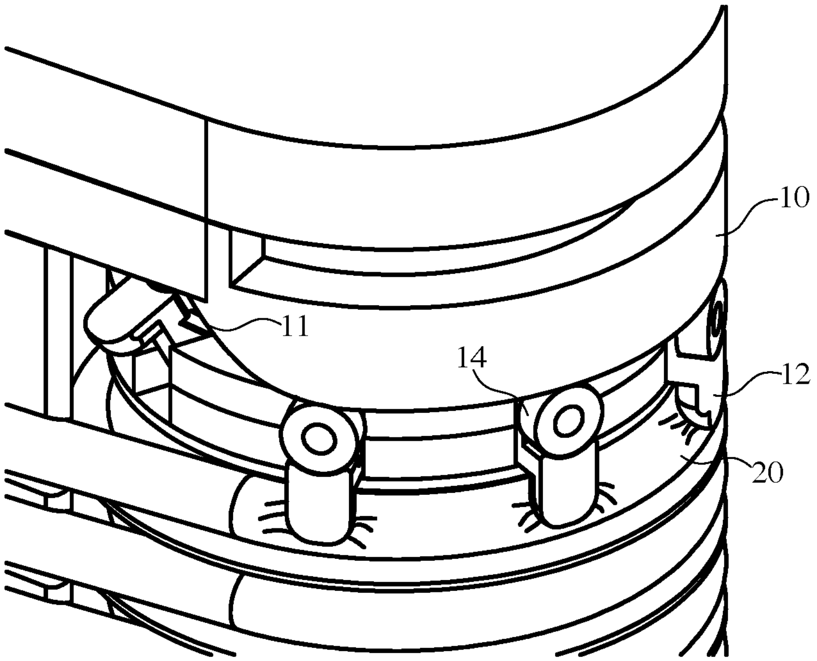
FIG. 13 is a front-right-top isometric view of the line tensioners, cam, and drive cylinder of FIG. 1, with the line.

In some embodiments, the line tensioners are constructed in two pieces, the L which includes the gripping portion and the lever arm, and the cam follower 14, which is a wheel attached to the L. The lever arm and gripping portion are formed as a single piece FIG. 13 is a front-right-top isometric view of the line tensioners, cam, and drive cylinder of FIG. 1, with the line. As the cam followers such as cam follower 14 follow the ramp 11 of the cam, the line tensioners are pushed into the gripping position. The gripping portion 12 is rotated to grip the line 20. The cam followers remain in contact with the cam, as the tensioners are rotated. The cam keeps the tensioners pushed down in the grip position until the cam followers encounter a second ramp on the other side of the cam. As the cam followers move along the second ramp the tensioners are moved from the grip position to the release position, and the tensioners release the line. The line tensioners are designed so that various types of line can be used with the tensioners. Different lines have different properties. In some embodiments, the line is a braided metal cable. In some of these embodiments, the metal cable is steel. In other embodiments, other metals are used in the cable such as titanium, aluminum, and alloys of these metals. In some embodiments, the line is a manufactured fiber such as nylon, Dynema®, Spectra®, Kevlar®, other synthetic fibers, or combinations of these and other fibers. Some of these lines are resistant to compression, while others are compressible. The gripping portion will interact differently with each of these line types. With incompressible lines, the grip portions will grip to the outer surface of the line. Some of the embodiments designed for use with incompressible lines will include coatings or coverings for the grip portions of the line tensioners. The coatings are designed to increase the friction and increase the ability of the tensioners to grip the line. In other embodiments, the line is compressible. In embodiments with compressible lines, the grip portion will compress the line where the grip portion is in contact with the line. FIG. 13 shows such an interaction. As the line tensioners are pushed into place, the grip portion 12 is moved to the gripping position, and the line 20 is compressed. This increases the friction and gripping force of each tensioner. The amount of compression depends on the compressibility of the line, as well as the diameter of the line. For a compressible line, the larger the diameter, the more the line will compress. The size of the drive grooves and idler pulleys will limit the size of line that can be used with the device.

Figure 14:
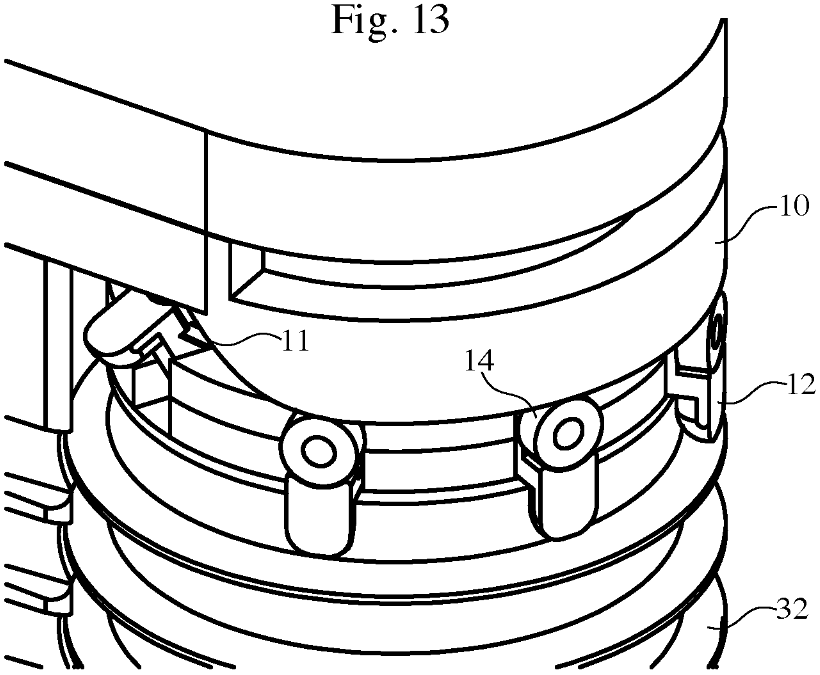
FIG. 14 is a front-right-top isometric view of the line tensioners, cam, and drive cylinder of FIG. 1, without the line.

FIG. 14 is a front-right-top isometric view of the line tensioners, cam, and drive cylinder of FIG. 1, without the line. As the cam followers such as cam follower 14 follow the ramp 11 of the cam, the line tensioners are pushed into the gripping position. The gripping portion 12 is rotated to grip the line 20. The cam followers remain in contact with the cam, as the tensioners are rotated. The cam keeps the tensioners pushed down in the grip position until the cam followers encounter a second ramp on the other side of the cam. As the cam followers move along the second ramp the tensioners are moved from the grip position to the release position.

Figure 15:
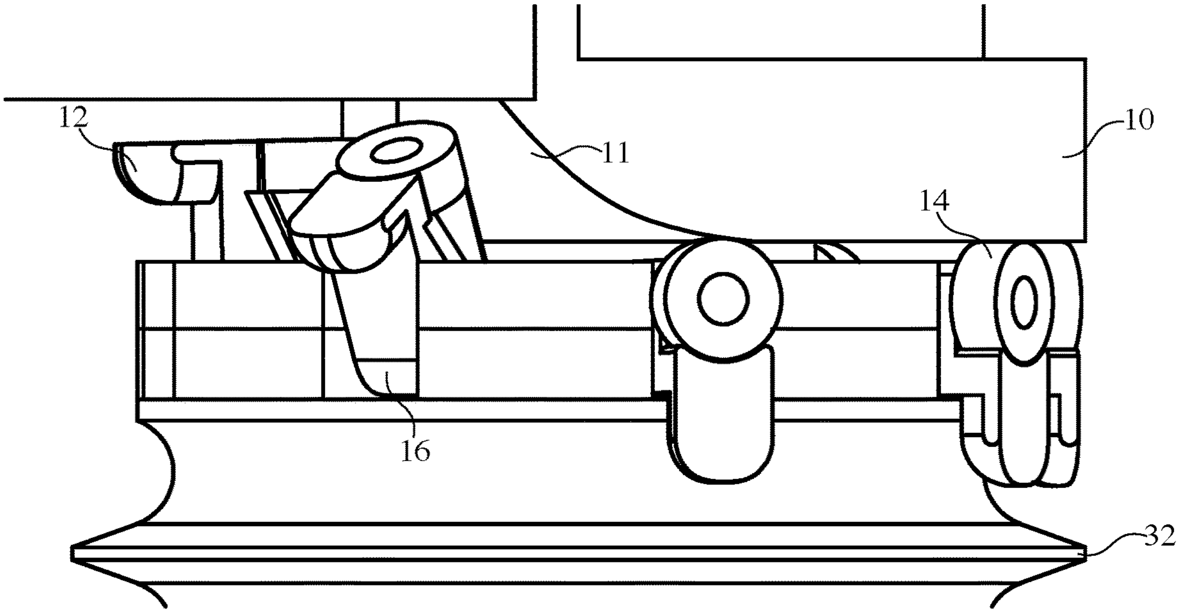
FIG. 15 is a front-left elevation view of the line tensioners, cam, and drive cylinder of FIG. 1, without the line.

FIG. 15 is a front-left elevation view of the line tensioners, cam, and drive cylinder of FIG. 1, without the line. The line tensioners consist of a line gripping portion 12, a cam follower 14, a lever arm 16, and a tension spring. The tensioners ride along a stationary cam surface 10. The tensioners are attached to a plate (as further described in FIG. 12). The line gripping portion 12 moves from a gripping position to a release position as the cam follower 14 rides along at least a portion of the cam surface 10, the line gripping portion 12 moving down into the gripping. The cam surface is shaped so the cam followers 14 will be moved from a release position to a grip position as the drive cylinder 32 is rotated. In some embodiments, the line tensioners are L-shaped with a grip portion 12 forming one leg of the L and a lever arm forming the other leg of the L. The line tensioners rotate so that each leg of the L will stop in positions that are 90-degrees from one another. Thus in some embodiments the lever arm will be in a vertical or 90-degree orientation in the release position and as the tensioner moves into the grip position the lever arm will be in a horizontal or 0-degree orientation. While the lever arm starts in a 90-degree orientation the grip portion begins in a 0-degree orientation and moves down to a vertical 90-degree orientation. The cam followers 14 attach to the line tensioners where the outer surface of the lever arm and the grip portion meet to form the right angle of the L. In some embodiments, the cam follower is a wheel. As the drive cylinder 32 is rotated, the cam followers ride along the cam surface. The cam includes a ramp or angled portion 11. The cam surface 10 is adjacent to the drive cylinder 32 along a C-shaped portion of the cam. This C-shaped portion of the cam is the area where the cam follower is in contact with the cam. When the cam follower is contacts the cam, the line gripping portion moves from its horizontal position to the vertical position. This occurs as the wheel 14 contacts the ramp 11 of the cam and stays in contact with the C-shaped portion 13 of the cam. The line grippers are designed so that the grip portion moves from a horizontal release position to a vertical grip position.

Figure 16:
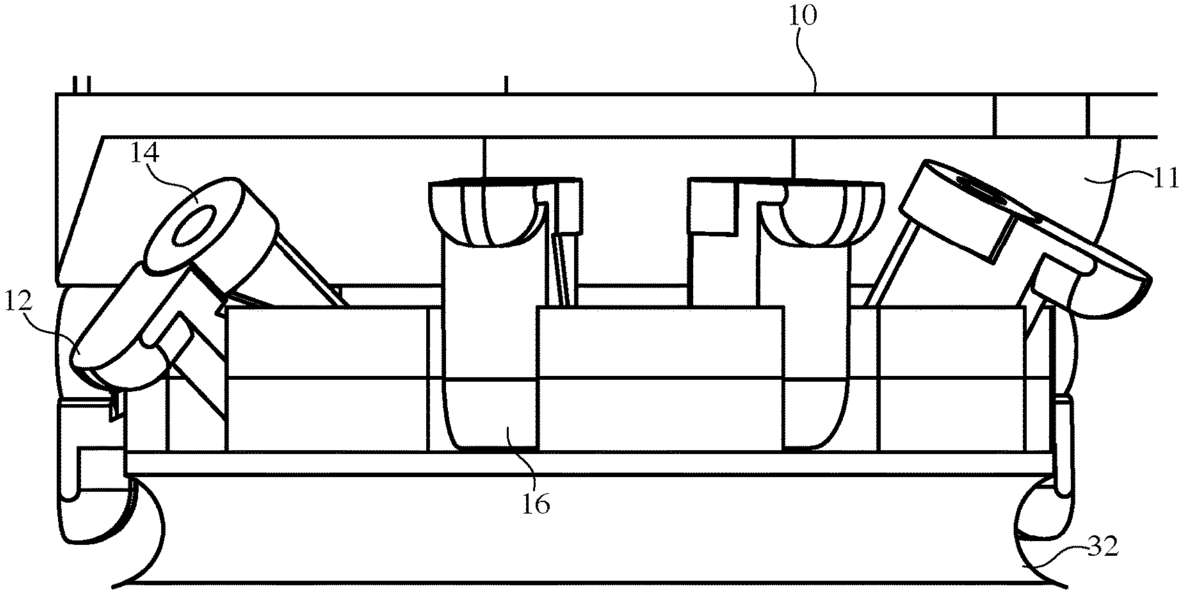
FIG. 16 is a front-left elevation view of the line tensioners, cam, and drive cylinder of FIG. 1, without the line.

FIG. 16 is a front-left elevation view of the line tensioners, cam, and drive cylinder of FIG. 1, without the line. As the drive cylinder is rotated, the plate to which the line tensioners are attached rotates. The line tensioners move from a release position to a grip position and back to a release position. In the release position, the lever arm, such as lever arm 16, is in a vertical position, while the grip portion, such as grip portion 12, is in a horizontal position, and the cam follower is not in contact with the cam. As the plate rotates the tensioners, the cam followers come in contact with ramp 11. The cam followers ride along the ramp 11 and push the tensioner into the grip position. The cam followers remain in contact with the cam throughout the rotation of the plate. Opposite to ramp 11 is a second ramp. The cam followers ride up the ramp and move from the grip position to the release position. This description has been explained as the rotation moves the line tensioners from left to right, however, the rotation moves in both directions so that the second ramp will push the tensioners in to the grip position and ramp 11 will facilitate movement from the grip position to the release position.

In some embodiments, sensors are provided that transmit information to the smart device, the sensors transmitting information selected from the group consisting of a force on the line, a position of the line in the device, power remaining in a battery that drives the motor, current draw by the motor, and combinations thereof.

In some embodiments, the device is mounted on and moves along a track such that the device lifts the object up, moves to a new location, and lowers the object down.

All patents and published patent applications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. A winch comprising:

a winch drum with at least one groove through which a line is passed; and a line tensioner assembly comprising:

a stationary cam surface; and a plurality of line tensioners rotating with the winch drum, each having a line gripping portion and a cam follower, wherein the line gripping portion is brought into and out of contact with the line as the cam follower rides along at least a portion of the cam surface.

2. The winch of claim 1, further comprising a motor configured to turn the winch drum.

3. The winch of claim 2, further comprising a controller configured to receive instructions and transmit a signal to the motor to rotate the drive cylinder.

4. A winch comprising:

a winch drum with at least one groove through which a line is passed; and a line tensioner assembly comprising:

a stationary cam surface; and a plurality of line tensioners rotating with the winch drum, each having a line gripping portion and a cam follower, wherein the line gripping portion is brought into and out of contact with the line as the cam follower rides along at least a portion of the cam surface;

wherein the cam surface is adjacent to the winch drum along a C-shaped portion of the cam surface and slopes away from the winch drum along a remaining portion of the cam surface, wherein the C-shaped portion pushes the cam follower such that the line gripping portion contacts the line, and the remaining portion brings the cam follower back such that the line gripping portion is out of contact with the line.

5. The winch of claim 4, wherein the winch is a capstan-effect winch.

6. The winch of claim 4, wherein the cam follower is a wheel.

7. The winch of claim 4, wherein the line gripping portion is brought out of contact with the line by a spring that pulls the line gripping portion away from the line.

8. The winch of claim 4, wherein the plurality of line tensioners comprise a first leg and a second leg joined in an L-shape, wherein:

the first leg is attached adjacent to the winch drum at a first end of the first leg and is attached to a second end of the second leg on a second end of the first leg, the plurality of line tensioners pivoting about first end of the first leg;

the cam follower is attached to the second end of the first leg; and the line gripping portion being a first end of the second leg.

9. A device for moving an object comprising:

a drive cylinder with at least three drive grooves rotating in parallel planes that are perpendicular to a long axis of the drive cylinder;

a shaft parallel to the drive cylinder upon which at least two idler pulleys rotate;

wherein the idler pulleys rotate in planes parallel to each other, which planes are at an angle to the parallel planes of the drive grooves, such that, as a line passes around a first drive groove, onto a first idler pulley, and around the first idler pulley, the line, as it comes off the first idler pulley, is aligned with a second drive groove; and wherein as the line comes around the second drive groove, onto a second idler pulley, and around the second idler pulley, the line, as it comes off the second idler pulley, is aligned with a third drive groove;

wherein the line is attached at a first end to an object and a second end is under tension;

wherein, as the drive cylinder is rotated the object is moved;

a line tensioner assembly that provides the tension to the second end comprising:

a stationary cam surface; and a plurality of line tensioners rotating with the drive cylinder, each having a line gripping portion and a cam follower, wherein the line gripping portion is brought into and out of contact with the line as the cam follower rides along at least a portion of the cam surface, the line gripping portion pressing the line, providing tension, when the line gripping portion is in contact with the line.

10. The device of claim 9, wherein the cam surface is adjacent to the drive cylinder.

11. The device of claim 9, wherein the cam surface is adjacent to the drive cylinder along a C-shaped portion of the cam surface and slopes away from the winch drum along a remaining portion of the cam surface, wherein the C-shaped portion pushes the cam follower such that the line gripping portion contacts the line, and the remaining portion brings the cam follower back such that the line gripping portion is out of contact with the line.

12. The device of claim 9, wherein the device is a capstan-effect winch.

13. The device of claim 9, wherein the cam follower is a wheel.

14. The device of claim 9, wherein the line gripping portion is brought out of contact with the line by a spring that pulls the line gripping portion away from the line.

15. The device of claim 9, wherein the plurality of line tensioners comprise a first leg and a second leg joined in an L-shape, wherein:

the first leg is attached adjacent to the winch drum at a first end of the first leg and is attached to a second end of the second leg on a second end of the first leg, the plurality of line tensioners pivoting about first end of the first leg;

the cam follower is attached to the second end of the first leg; and the line gripping portion being a first end of the second leg.

16. The device of claim 9, further comprising a motor configured to rotate the drive cylinder.

17. The device of claim 16, further comprising a controller configured to receive instructions and transmit a signal to the motor to rotate the drive cylinder.

18. The device of claim 17, further comprising a smart device configured to transmit instructions to the controller.

19. The device of claim 18, further comprising sensors that transmit information to the smart device, the sensors transmitting information selected from the group consisting of a force on the line, a position of the line in the device, power remaining in a battery that drives the motor, current draw by the motor, and combinations thereof.

20. The device of claim 18, wherein the motor is powered by a battery.

* * * * *